Sept. 25, 1956
C. T. GOLLEHON
2,764,183
FLOW CONTROL DEVICE
Filed Aug. 13, 1951
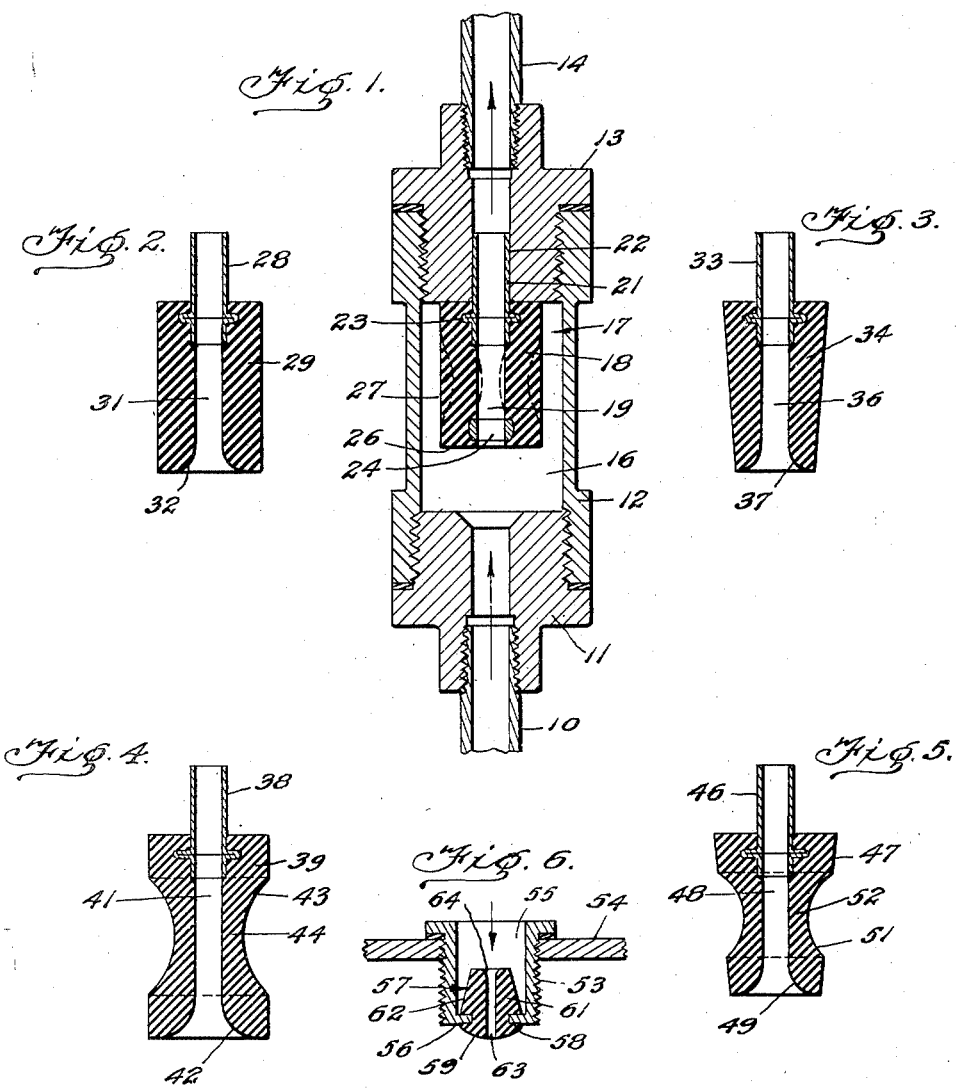
Inventor
Carroll T. Gollehon
By McCanna and Morsbach
Attorneys United States Patent Office 2,764,183
Patented Sept. 25, 1956

2,764,183

FLOW CONTROL DEVICE

Carroll T. Gollehon, Delavan, Wis.

Application August 13, 1951, Serial No. 241,624

9 Claims. (Cl. 138—45)

This invention relates to flow control devices for controlling the rate of flow and pressure of a fluid to provide a uniform output from a variable pressure source.

It is frequently necessary in a fluid system to deliver a liquid from a source having a variable pressure to a point of use at a substantially uniform lower pressure and rate of flow without resort to complicated mechanisms. This invention contemplates a flow control device having a novel and improved control member of resilient material capable of more accurate and uniform control of the pressure than in prior art devices.

An important object of the invention is the provision of an improved control device of the type in which a fluid flowing in a system is throttled down to a uniform flow at a lower pressure by automatic restriction of the cross-sectional area of a bore in a resilient control member, in response to fluctuations in pressure on the surface of the control member intermediate its ends.

Another object is the provision of an improved control device having an improved resilient and compressible control member housed in a chamber wherein areas of the control member are exposed to pressure fluctuations to compress the control member intermediate its ends and thus restrict the cross-sectional area of an axial passage therethrough.

A further object is the provision of an improved resilient and compressible control member in elongated form having an axial passage and an area intermediate the ends of the member adapted to be exposed to the pressure of the fluid in the system and to be compressed thereby to regulate the flow through the axial passage.

A still further object is the provision of a control device having a resilient compressible control member housed in a chamber disposed in a conduit of a fluid system wherein areas intermediate the ends of the control member are exposed to pressure fluctuations on the higher pressure side of the system to compress the member and constrict portions of an axial passage therethrough in varying degrees and thereby produce a substantially uniform flow through the control member.

Other objects and advantages will appear from the following description and the accompanying drawings, in which:

Figure 1 is a sectional view taken longitudinally through a flow control device constructed in accordance with the invention;

Figs. 2, 3, 4 and 5 are longitudinal sectional views through modified forms of the control member showing the manner in which the device may be adapted for use at different pressures, and Fig. 6 is a longitudinal section through a modified form of the flow control device.

Referring first to the form shown in Figure 1, there is therein shown a control device adapted to be connected directly into a conduit to which fluid is conducted from one point to another in the system. The numerals 10 and 14 indicate conduits in a fluid system in which the fluid flows in the direction indicated by the arrows, namely, from conduit 10 to conduit 14. Interposed between these conduits is the novel control device which, while it may be constructed in many different ways, suitably includes a body formed of a bushing 11 attached to the conduit 10, a bushing 13 attached to the conduit 14, and a tube 12 interconnecting the bushings to form therewith a chamber 16. The bushings 11 and 13 each have a bore or passage extending from the respective conduit to the chamber 16, as will be apparent from Figure 1.

The control member indicated generally by the numeral 17 is disposed in the chamber 16 and comprises a tubular body of resilient and compressible material. For most applications the body of the member may be made of rubber or analogous material such as synthetic rubber and synthetic resins having resilience and compressibility. However, the composition depends to a considerable extent upon the service conditions where the device is to be used, as, for example, the pressure and temperature of the fluid being controlled. The body has a central, preferably axial passage or bore 19, and interposed in this passage so as to project beyond one end of the body is a mounting member 21, in this instance comprising a ferrule formed of tubular stock of a soft metal such as copper, brass, aluminum or the like, shaped for reception in the passage 19 and having an annular flange 23 which may be formed by compressing the tube endwise. The flange serves to retain the ferrule within the body. Where the body is of sufficiently resilient material it is possible to insert the ferrule into the bore after the control member is formed, but in some instances it may be necessary to mold the ferrule in place. The external diameter of the ferrule 21 is such as to have a tight friction fit within the bore of the bushing 13 and serves to retain the control member in position with one end abutting the inner face of the bushing. In the form shown in Figure 1, a ring or other reinforcing element 24 is disposed in the body around the passage 19 adjacent the end thereof opposite the ferrule 21, the purpose being to prevent collapse of the control member adjacent the entrance of the passage 19.

The fluid flowing in the system moves in the direction indicated by the arrows from the conduit 10 into the chamber 16 and thence through the passage 19 and ferrule 21 to the conduit 14, the chamber 16 being disposed toward the high pressure side of the system. It will be seen that the transverse dimension of the chamber 16 is substantially greater than the transverse dimension of the control member so that the fluid contacts the outer side of the control member intermediate its ends. It will be seen that this pressure causes the control member to collapse, somewhat in the manner shown by the dotted lines in Figure 1, and the amount of this collapse is in direct proportion to the pressure within the chamber 16. This collapse of the control member acts to restrict the cross-sectional area of the passage 19 so that as the pressure increases within the chamber 16 the rate of flow through the passage 19 decreases, with the result that a substantially uniform rate of flow is produced in the outlet conduit 14.

Under many conditions of use the ring 24 may be eliminated, but where this is done, the entrance to the bore 19 may be flared in the manner shown in Figs. 2 through 5. The form shown in Fig. 2 is identical with that of Figure 1 having a body 29, a ferrule 28 disposed in the passage 31 of the body. However, the entrance to the bore 31 is flared outwardly as shown at 32 so that any tendency of the extreme free end of the control member to dish inwardly about the passage 31 will not restrict the area of the passage.

Fig. 3 shows a control member having a body portion of slightly different shape from which it will be seen that the body portion may be tapered inwardly toward its free end. This structure likewise has a ferrule 33, a body 34 provided with a central passage 36, the end of the passage being flared as shown at 37.

In Figs. 4 and 5 there is shown the manner in which control devices of different flow characteristics may be produced by altering only one of the several factors affecting the same. One of the problems in devices of this character is maintaining uniformity in production so that each of a series of devices intended for use under the same conditions will operate within the same pressure range. To accomplish this the composition and resiliency of the control members must be maintained within close limits and likewise the shape characteristics. One important advantage of the present construction lies in the fact that a wide range of variation can be obtained using a single composition of material for the body member. This is accomplished by forming an annular groove as shown at 43 in the outer surface of the body portion intermediate the ends of the control member so as to provide a central cross-sectional area as indicated at 44 which is of greater flexibility and will therefore function to restrict the central passage 41 to a preselected degree in response to the pressure in the chamber 16. By varying the shape of the groove 43, the operating characteristics of the control member can be readily adjusted to produce control members operating in different pressure ranges. The control member shown in Fig. 4 is similar to that of Fig. 2 and includes the control member 39, ferrule 38, central passage 41 and the flared end 42.

The arrangement shown in Fig. 5 is similar to that of Fig. 3 having a ferrule 46, control member 47 provided with a central passage 48 having the flared end 49. The member has the annular groove 51 similar to that shown at 43 in Fig. 4 providing the more flexible cross-sectional area shown at 52.

In Fig. 6 there is shown the manner in which the control member may be mounted in the walls of a tank or the like or in the wall of a multiport valve for the purpose of controlling the rate of flow from the chamber of the tank or other device. In this form the numeral 54 designates the wall of the pressure chamber, wherein the higher pressure exists on the upper side of the wall. The wall has an aperture in which a ferrule 55 is threaded, the ferrule having an inturned flange as shown at 56. The body 61 of the control member has a central passage 63 flared at its inner end as shown at 64 and provided with an annular groove 58 for the reception of the flange 56 to retain the control member in position across the aperture. The outer annular wall of the control member 57 is frusto-conical in shape, as indicated at 62, and is spaced from the inner walls of the ferrule so that the fluid within the chamber has free access to the side walls of the control member intermediate its ends. The protruding end of the control member may be given any desired shape as may be required by circumstances, the end in this instance being arcuate, as shown at 59. It will be seen that pressure within the chamber acts on the side walls 62 to compress the body member so as to reduce the cross-sectional area of the passage 63 intermediate its ends. The flared portion 64 of the passage permits the inner end of the body member to compress to a greater degree than the opposite end thereof without materially restricting the area of the passage at the point of entrance.

I claim:

1. A fluid flow control member comprising a tubular body of circular cross-section and greater length than width having a central passage and means for supporting the body at an aperture of a pressure chamber with its outer side exposed to the pressure within the chamber for egress of fluid from the chamber through the passage, said supporting means comprising a tube projecting from one end of the body concentric with the passage and shaped for reception in the aperture of the pressure chamber, the body being formed of a resilient and distortable material through a portion intermediate its ends to be distorted in varying degrees in response to changes in pressure in the chamber and thereby vary the size of the passage intermediate its ends.

2. The combination recited in claim 1 wherein the tube comprises a metal tube anchored in the body within the passage having a press fit within the aperture.

3. A flow control device including structure defining a casing having fluid inlet and outlet passages and a chamber upstream of said outlet passage, said chamber being of larger internal diameter than said outlet passage and having a base wall defining a shoulder extending radially outward of said passage, a cylinder of less diameter than said chamber secured on said shoulder with the peripheral wall of said cylinder spaced from the inner wall of said chamber to provide an annular space communicating with said inlet passage, said cylinder having an axial passage registering with said casing outlet passage, means for maintaining a pre-established diameter of the inlet portion of said cylinder passage, and means for maintaining a pre-established diameter of the outlet portion thereof; a relatively long body portion of said cylinder intermediate its said inlet and outlet portions being of resilient material, whereby the area of the axial passage of said body portion of the cylinder intermediate its inlet and outlet portions will expand or contract according to the pressure differential between the static head of fluid within said annular space and the velocity head of fluid flowing through said cylinder passage.

4. A flow control device, including means defining a casing having fluid inlet and outlet passages and a chamber upstream of said outlet passage, said chamber being of larger internal diameter than said outlet passage and having a base wall defining a shoulder extending radially outward of said passage, a cylinder of less diameter than said chamber secured on said shoulder with the peripheral wall of said cylinder spaced from the inner wall of said chamber to provide an annular space communicating with said inlet passage, said cylinder having an axial passage registering with said casing outlet passage, a ferrule fixed about the inlet portion of said cylinder passage for maintaining a pre-established diameter of said inlet portion, and means for securing said cylinder on said shoulder with the cylinder passage in registry with said outlet passage; a relatively long body portion of said cylinder below said ferrule and comprehending the intermediate portion of said cylinder being of resilient material whereby the area of the axial passage of the intermediate portion of the cylinder will expand or contract according to the pressure differential between the static head of fluid within said annular space and the velocity head of fluid flowing through said cylinder passage.

5. A flow control device comprising a casing defining a chamber and having a fluid outlet therein, a flow control member for maintaining a substantially constant flow from said chamber through said outlet over a wide range of fluid pressures in said chamber comprising an elongated body of circular cross section dimensioned shorter and smaller than said chamber and having an axial flow passage extending therethrough, means for supporting said body adjacent one end thereof on said casing with the peripheral wall of said body spaced from the chamber walls and with the axial passage in the body registering with said fluid outlet and in fluid sealed relation therewith, the other end of said body being spaced from the walls of said chamber whereby the fluid in said chamber surrounds the peripheral wall and said other end of said body and applies pressure to the body at the sides and at said other end thereof, said body being formed of a resilient and distortable material and having a peripheral area greater than the cross sectional area at said other end of the body whereby the pressure differential between the static head of fluid in said chamber and the velocity head of fluid flowing through said axial passage will radially compress said body and constrict said axial passage by an amount dependent on the magnitude of said pressure differential, the thickness of the walls of said body intermediate the ends thereof being sufficient to prevent collapse of the body in the normal operating range of pressures within said chamber, and means for preventing construction of the axial passage at said other end of said member, in the normal operating range of fluid pressures in said chamber, to a diameter smaller than the normal undistorted diameter of said axial passage at a point intermediate the ends of said body.

6. The combination of claim 5 wherein said last mentioned means includes a rigid ring affixed to said body adjacent said other end thereof and arranged to prevent constriction of said passage at said other end of said body.

7. The combination of claim 5 wherein said body has an annular recess extending therearound intermediate the ends thereof and in the portion of said body exposed to the fluid pressure in said chamber to provide a central more easily distortable portion.

8. A flow control device comprising a casing defining a chamber and having a fluid outlet therein, a flow control member for maintaining a substantially constant flow from said chamber through said outlet over a wide range of fluid pressures in said chamber comprising an elongated body of circular cross section dimensioned shorter and smaller than said chamber and having an axial flow passage extending therethrough, means for supporting said body adjacent one end thereof on said casing with the peripheral wall of said body spaced from the chamber walls and with the axial passage in the body registering with said fluid outlet and in fluid sealed relation therewith, the other end of said body being spaced from the walls of said chamber whereby the fluid in said chamber surrounds the peripheral wall and said other end of said body and applies pressure to the body at the sides and at said other end thereof, said body being formed of a resilient and distortable material and having a peripheral area greater than the cross sectional area at said other end of the body whereby the pressure differential between the static head of fluid in said chamber and the velocity head of fluid flowing through said axial passage will radially compress said body and constrict said axial passage by an amount dependent on the magnitude of said pressure differential, the thickness of the walls of said body intermediate the ends thereof being sufficient to prevent collapse of the body in the normal operating range of pressures within said chamber, said axial passage at said other end of said body being outwardly flared, the amount of flare of said passage being sufficient to prevent constriction of said passage at said other end of said body, in the normal range of fluid pressures in said chamber, to a diameter smaller than the normal undistorted diameter of said axial passage at a point intermediate the ends of the latter.

9. The combination of claim 8 wherein the radial thickness of the walls of said body is less intermediate the ends of said body than adjacent said other end of said body to provide a central more easily distortable portion.

References Cited in the file of this patent

UNITED STATES PATENTS

| | | |
|---|---|---|
| 225,776 | Wilson | Mar. 23, 1880 |
| 657,007 | Richter | Aug. 28, 1900 |
| 1,930,107 | Rang | Oct. 10, 1933 |
| 2,276,911 | Alward | Mar. 17, 1942 |
| 2,444,449 | Kearny | July 6, 1948 |
| 2,568,519 | Smith | Sept. 18, 1951 |

FOREIGN PATENTS

| | | |
|---|---|---|
| 372,286 | Great Britain | May 2, 1932 |